United States Patent [19]

Steiner

[11] 4,133,660
[45] Jan. 9, 1979

[54] ADSORBER FOR REMOVING POLLUTANTS FROM GASES HAVING UNIFORM ADSORPTION CAPABILITY

[75] Inventor: Peter Steiner, Edison, N.J.

[73] Assignee: Foster Wheeler Energy Corporation, Livingston, N.J.

[21] Appl. No.: 869,897

[22] Filed: Jan. 12, 1978

[51] Int. Cl.$^2$ .................................................. B01D 39/00
[52] U.S. Cl. ......................................... 55/387; 55/479; 55/484; 55/390; 55/474
[58] Field of Search ................. 55/73, 79, 98, 99, 387, 55/479, 474, 484, 482, 390

[56] References Cited

U.S. PATENT DOCUMENTS

| 3,717,976 | 2/1973 | Gappa et al. | 55/73 |
| 3,873,287 | 3/1975 | Barnekey | 55/387 |

FOREIGN PATENT DOCUMENTS 2239827  2/1974  Fed. Rep. of Germany ............. 55/479

Primary Examiner—Bernard Nozick
Attorney, Agent, or Firm—Marvin A. Naigur; Warren B. Kice

[57] ABSTRACT

A system for removing pollutants from gases in which one or more beds of activated char are formed in a housing having an upper chamber and a lower chamber. A first series of beds of activated char extend through both the lower chamber and the upper chamber and an additional series of beds of activated char are disposed only in the lower chamber. A system of passages and baffles are provided in the housing to direct the gases in the upper chamber through the first series of beds of activated char, and the gases in the lower chamber through the first series of beds of activated char and then through the additional beds of activated char, before the gases exit from the housing.

6 Claims, 4 Drawing Figures

U.S. Patent  Jan. 9, 1979  4,133,660
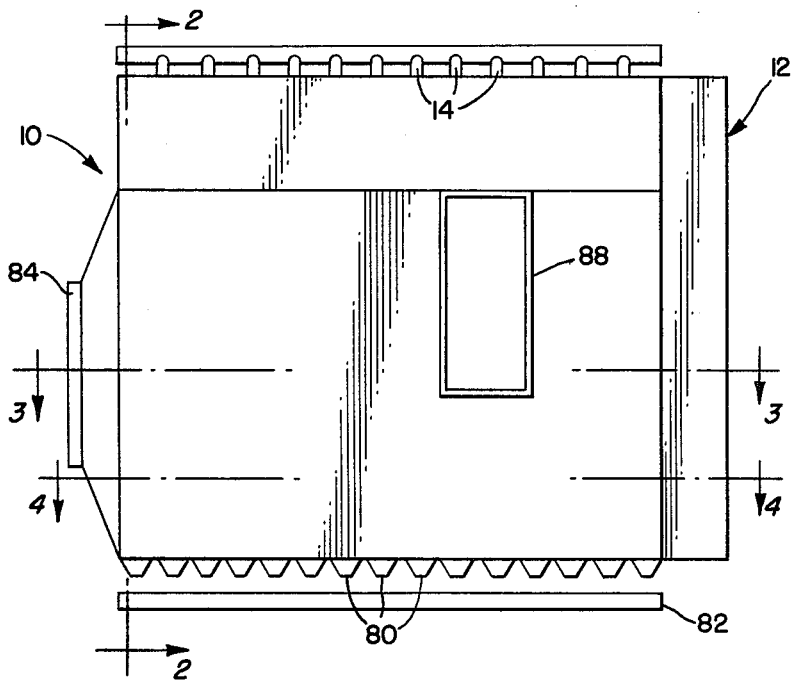
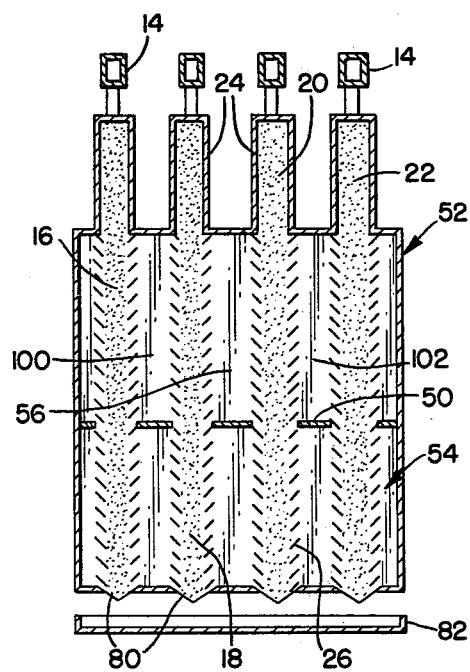
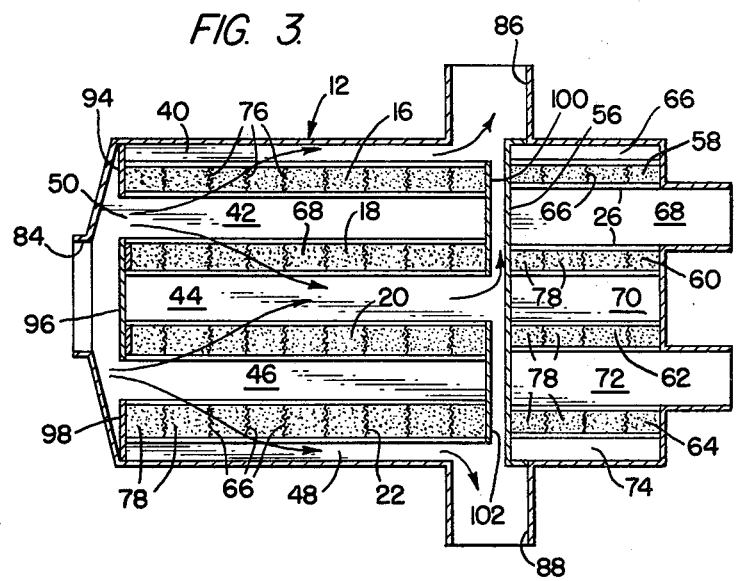
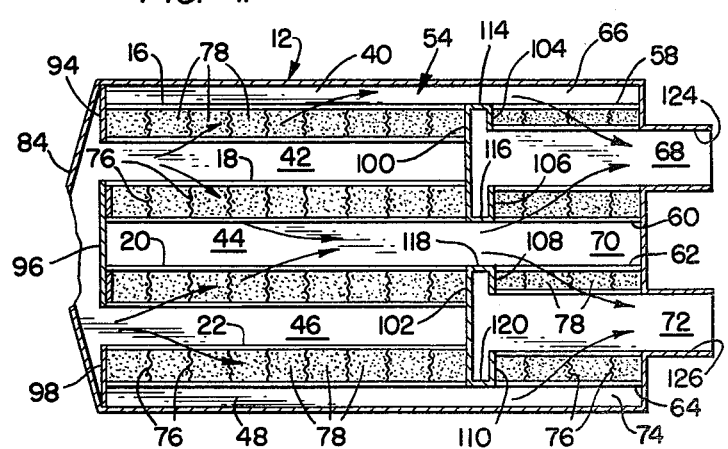

ADSORBER FOR REMOVING POLLUTANTS FROM GASES HAVING UNIFORM ADSORPTION CAPABILITY

BACKGROUND OF THE INVENTION

This invention relates to the removal of pollutants from gases and, more particularly, to an adsorber system in which pollutant laden gases are passed through columns of activated char to adsorb the sulfur oxides from the gases into the char pellets.

The technique of adsorption to remove sulfur oxides from pollutant-laden gases, such as flue gases from a fossil fuel boiler, is well known. According to this basic process, an adsorber is provided which receives the gases and includes a bed of activated char located in the path of the gases. As a result, the $SO_2$, oxygen and water vapor in the gases come into contact with, and are adsorbed by, the char pellets. The $SO_2$ in the gases is oxidized to $SO_3$ and subsequently catalytically converted to sulfuric acid which is held in the interior pore system of each char pellet. The substantially pollutant-free gases are then passed to a stack, or the like, for exhaustion into the atmosphere.

The adsorber usually contains one or more vertical beds of activated char which moves downwardly in mass flow while adsorbing the pollutants from the gases. The upper portion of the char bed is continuously replenished while the saturated char is collected at the bottom and sent by conveyors to other sections of the system. For example, the saturated char can be sent to a regenerator for regenerating the saturated char by thermal or wet regeneration to reverse the reactions taking place in the adsorber and produce a concentrated steam of $SO_2$, $H_2O$, $CO_2$, and $N_2$. The stream of $SO_2$ can then be further treated to produce relatively pure sulfur.

In these type of arrangements it has been discovered that due to the length of the vertical beds, less adsorption of the pollutants from the gases passing through the lower portion of the adsorber housing is achieved when compared to the gases passing through the upper portion of the housing. This is due to the fact that the char in the lower portion of the housing is less active than that in the upper, since the former is more saturated with pollutants by virtue of its increased exposure to the gases as it passes downwardly in the housing. As a result, it is impossible to achieve a constant average degree of adsorption of the pollutants and, in addition, a less than optimum system efficiency is achieved.

U.S. Pat. No. 3,717,976, of which the present inventor is a co-inventor, teaches a process in which the gases in the lower part of the adsorber are passed through an additional bed of activated char to remove additional pollutants therefrom. However, this method is limited to the use of only one bed of char extending through the upper and lower portions of the adsorber and one additional bed of char in the lower portion of the adsorber. As a result, the adsorption capacity of the adsorber is severely limited.

SUMMARY OF THE INVENTION

It is therefore an object of the present invention to provide an adsorber for adsorbing pollutants from gases in which a uniform adsorption efficiency is achieved.

It is a further object of the present invention to provide an adsorber of the above type which enjoys a relatively high adsorption capacity.

It is a more specific object of the present invention to provide an adsorber of the above type in which a plurality of beds of activated char are provided in the upper portion of the adsorber and a plurality of additional beds of activated char are provided in the lower portion of the adsorber in order to insure a uniform adsorption of the pollutants from all the gases entering the adsorber and to increase the adsorption capacity.

Towards the fulfillment of these and other objects, the system of the present invention includes a housing having inlet means for receiving the pollutant-laden gases and outlet means for discharging the gases. An upper chamber and a lower chamber are defined in the housing, and a first series of beds of activated char extend through the upper chamber and the lower chamber, while an addtional series of beds of activated char are defined in the lower chamber. The gases are directed from the inlet means, across the first series of beds of activated char in the upper chamber and to the outlet means. In the lower chamber the gases are directed from the inlet means across the first series of beds of activated char, across the additional series of beds of activated char and to the outlet means.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein:

FIG. 1 is a side elevational view of the housing of the system of the present invention; and FIGS. 2, 3 and 4 are cross sectional views taken along the lines 2—2, 3—3 and 4—4, respectively of FIG. 1.

DESCRIPTION OF THE PREFERRED EMBODIMENT

The adsorber of the present invention is shown by the reference number 10 in FIGS. 1 and 2 and includes a housing 12 of suitable refractory material, or the like, having a plurality of feeders 14 disposed on the upper portion thereof for receiving activated char from a source (not shown) and directing same into the upper portions of a plurality of vertical columns 16, 18, 20, and 22 (FIG. 2) located within the housing. The upper portions of the side walls of the columns 16–22 are defined by surge sections 24 (FIG. 2) formed in the upper portion of the housing 12, and the remaining portions of the side walls are formed by a plurality of parallel louvers 26. The louvers 26 are sized and placed at optimum inlet and outlet angles to maintain a bed of char therein yet permit the flow of gases therethrough, as will be described in detail later.

As shown in FIG. 3, the columns 16 and 22 are spaced slightly from the corresponding side walls of the housing 12, and each of the columns 16, 18, 20, and 22 extends in a spaced, parallel relationship. As a result, a passage 40 is defined between the column 16 and adjacent side wall of the housing 12, a passage 42 is defined between the column 18 and the column 16, a passage 44 is defined between the column 20 and the column 18, a passage 46 is defined between the column 22 and the column 20, and a passage 48 is defined between the column 22 and the adjacent side wall of the housing 12.

As better shown in FIG. 2, a horizontal partition 50 is provided in the housing 12 to divide a portion of the latter into an upper chamber 52 and a lower chamber 54. The partition 50 extends from the front end wall of the housing 12 to a vertical wall 56 (FIGS. 2 and 3) located adjacent the columns 16–22 and extending from the upper portion of the housing to the partition 50.

As better shown in FIG. 3 an additional series of vertical columns 58, 60, 62, and 64 are located within the housing 12 and extend between the wall 56 and the rear wall of the housing. The upper portions of the side walls of the columns 58–64 are defined by additional surge sections 24 formed in the upper portion of the housing 12, and the remaining portions of the side walls are formed by a plurality of parallel louvers 26, as discussed above.

The columns 58 and 64 are spaced slightly from the corresponding side walls of the housing 12, and each of the columns 58, 60, 62, and 64 extend in a spaced, parallel relationship. As a result a passage 66 is defined between the column 58 and adjacent side wall of the housing 12, a passage 68 is defined between the column 60 and the column 58, a passage 70 is defined between the column 62 and the column 60, a passage 72 is defined between the column 64 and the column 62, a passage 74 is defined between the column 64 and the adjacent side wall of the housing 12.

A plurality of sheets 76 of a mesh-like material are provided at spaced intervals along each column 16–22 and 58–64 to subdivide each of the columns into a plurality of beds 78, each of which receives the activated char from a corresponding distributor 14. A char outlet 80 (FIGS. 1 and 2) is associated with each bed 78 and discharges the char into a collection trough 82 for further treatment, such as the regeneration step described above.

As a result of the foregoing, the char is continuously introduced into the columns 16–22 and 58–64 where it passes downwardly before discharging from the outlets 80 and into the trough 82.

An inlet 84 for pollutant-laden gases from a fossil fuel boiler, or the like, is formed in the housing 12 at one end thereof and communicates with both the upper chamber 52 and the lower chamber 54. Two outlets 86 and 88 are formed in the side walls of the housing 12 adjacent the vertical wall 56. As shown in FIG. 3 the columns 16–22 are spaced inwardly from the front end wall of the housing 12 and from the wall 56 to permit passage of the gases in the upper chamber 52 from the inlet 84 through the various passages 40–48, and from the latter to the outlets 86 and 88, as will be decribed in detail later.

As also shown in FIG. 3, a vertical partition 94 is formed in the housing 12 and extends across the end of the column 16 adjacent the inlet 84 and across the passage 40 to block the direct flow of gases therethrough. In a similar manner a vertical partition 96 is formed across the ends of the columns 18 and 20 adjacent the inlet 84 and across the passage 44, and a vertical partition 98 extends across the end of the column 22 adjacent the inlet 84 and across the passage 48 also to block the direct flow of gases through these columns and passages. Also, a vertical partition 100 is provided which extends across the other ends of the columns 16 and 18 and the passage 42, and a vertical partition 102 extends across the other ends of the columns 20 and 22 and the passage 46, also to block the direct flow of gases from these columns and passages to the outlets 86 and 88.

Each of the partitions 94–102 extends from the upper portion of the housing 12 to the lower portion thereof for the height of the upper and lower chambers 52 and 54. Also, as shown in FIG. 4, in the lower chamber 54 a plurality of partition 104, 106, 108, and 110 are located immediately below the wall 56 and extend over the end of the columns 58, 60, 62 and 64, respectively. Also, in the lower chamber 54, a partition 114 extends across the space between the columns 16 and 58, a partition 116 extends across the space between the columns 20 and 62 and a partition 120 extends across the space between the columns 22 and 64.

A pair of outlets 124 and 126 are formed in the housing 12 in communication with the passages 68 and 72 in the lower chamber 54. As a result of the above arrangement of inlets, outlets, passages and partitions, gas flow in the lower chamber 54 is shown by the flow arrows in FIG. 4 and will be described in detail later.

In operation, activated char is continuously supplied to the columns 16–22 and 58–64 from the feeders 14 where passes downwardly through the entire length of the columns before exiting via the outlets 80. A portion of the pollutant-laden gases entering the inlet 84 of the housing 12 pass into the upper chamber 52 where the partitions 94–102 direct the gases into the passages 42 and 46, across the columns 16–22 of activated char, and to the passages 40, 44 and 48 before they impinge against the vertical wall 56 and are directed to the outlets 86 and 88, as shown by the flow arrows in FIG. 3. As a result of passing across the columns 16–22 of activated char, the $SO_2$ in the gases is adsorbed by the char in the manner discussed above.

The remaining portion of the gases entering the housing 12 pass into the lower chamber 54 where they are directed in the same manner as discussed above until they leave the outlet ends of the passages 40, 44, and 48. At this point they pass into the passages 66, 70, and 74 in the rear portion of the housing as shown by the flow arrows in FIG. 4 from which they are directed across the columns 58–64 of activated char before exiting from the housing 12 via the passages 68 and 72 and the outlets 124 and 126.

As a result, the gases passing through the lower chamber 54 of the housing 12, are subjected to an additional adsorption by the char in the columns 58–64. This is to compensate for the reduction in adsorption that takes place in the lower portions of the columns 16–22 due to the fact that the char in the latter portions is less active by virtue of being continuously contacted by gases during its movement downwardly from the upper portions of the columns to the lower portions.

The substantially pollutant-free gases exiting from the outlets 86, 88, 124 and 126 can then be passed to a stack, or the like, for exhaustion into the atmosphere.

It is thus seen that the arrangement of the present invention provides an effective means of adsorbing the pollutants from a relatively high volume of gases in a uniform and efficient manner.

It is understood that several variations may be made in the foregoing without departing from the scope of the invention. For example, the number of columns of beds and corresponding gas flow passages can be changed in accordance with particular design requirements.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A system for removing pollutants from gases comprising a housing having inlet means for receiving said gases and first and second outlet means for discharging said gases, means for defining an upper chamber and a lower chamber in said housing, means in said housing for receiving a first series of beds of activated char extending through said upper chamber and said lower chamber, means in said housing for receiving a second series of additional beds of activated char in said lower chamber, means formed in said upper chamber for directing said gases from inlet means, across said first series of beds of activated char in said upper chamber and to said first outlet means, and means disposed in said lower chamber for directing said gases from said inlet means across said first series of beds of activated char in said lower chamber, across said additional series of beds of activated char in said lower chamber and to the second outlet means.

2. The system of claim 1, wherein said beds of activated char are disposed in a spaced relation in said housing with each of said beds being disposed in a spaced relation to the respective side walls of said housing, said directing means including passage means defined in the spaces between adjacent beds and in the spaces between said side walls and the beds adjacent said side walls.

3. The system of claim 1, wherein there are two pairs of beds of activated char all disposed in a spaced parallel relationship, with the beds adjacent the side walls of said housing being disposed in a spaced relation to their respective side walls, said directing means including passage means defined in the spaces between adjacent beds and in the spaces between said side walls and the beds adjacent said side walls.

4. The system of claim 2, wherein said first outlet means includes at least one outlet communicating with said upper chamber and wherein said second outlet means includes at least one outlet communicating with said lower chamber.

5. The system of claim 4, wherein said directing means further comprises baffle means disposed in said upper chamber and cooperating with said passage means in a manner to direct said gases in the said upper chamber from said inlet means, through said passage means, across said first series of beds of activated char in said upper chamber and out said outlet communicating with said upper chamber.

6. The system of claim 4, wherein said directing means further comprises baffle means disposed in said lower chamber and cooperating with said passage means in a manner to direct said gases in said lower chamber from said inlet means, into said passage means, across said first series of beds of activated char, into said passage means, across said additional series of beds of activated char and out said outlet communicating with said lower chamber.

* * * * *